United States Patent
Haas et al.

(10) Patent No.: US 11,888,819 B2
(45) Date of Patent: Jan. 30, 2024

(54) SECURE ACCESS TO MULTIPLE ISOLATED NETWORKS

(71) Applicant: Axonius Solutions Ltd., Tel-Aviv (IL)

(72) Inventors: Sagi Haas, Kadima (IL); Dean Sysman, New York, NY (US); Ofri Shur, Kfar Saba (IL); Avidor Bartov, Tel-Aviv (IL)

(73) Assignee: Axonius Solutions Ltd., Tel-Aviv (IL)

( * ) Notice: Subject to any disclaimer, the term of this patent is extended or adjusted under 35 U.S.C. 154(b) by 267 days.

(21) Appl. No.: 17/521,981

(22) Filed: Nov. 9, 2021

(65) Prior Publication Data

US 2023/0146393 A1     May 11, 2023

(51) Int. Cl.
*H04L 9/40*     (2022.01)

(52) U.S. Cl.
CPC ........ *H04L 63/0272* (2013.01); *H04L 63/029* (2013.01); *H04L 63/162* (2013.01)

(58) Field of Classification Search
CPC . H04L 63/0272; H04L 63/029; H04L 63/162; H04L 63/101; H04L 63/20
See application file for complete search history.

(56) References Cited

U.S. PATENT DOCUMENTS

| | | | |
|---|---|---|---|
| 2016/0050125 A1* | 2/2016 | Mattson | H04L 41/0806 709/225 |
| 2019/0306282 A1* | 10/2019 | Masputra | H04L 47/193 |
| 2020/0092193 A1* | 3/2020 | Tillotson | G06F 16/24573 |
| 2022/0321469 A1* | 10/2022 | Qian | H04L 45/586 |
| 2023/0079209 A1* | 3/2023 | Nallamothu | H04L 45/745 |

* cited by examiner

*Primary Examiner* — Theodore C Parsons

(57) ABSTRACT

Disclosed herein are devices, systems and methods for securely accessing data transferred via multiple isolated networks network, comprising adjusting one or more mapping records comprising network mapping and routing settings for a plurality of isolated networks connecting a plurality of clients to a server to expose one of the plurality of isolated networks to one or more processing engines executed by the server while concealing all other isolated networks from the respective processing engine, activating a lock configured to enable each processing engines to execute a single thread, executing the processing engine(s) to fetch data from the exposed isolated network(s), and releasing the lock. Wherein each processing engine is able to access the isolated network exposed to the respective processing engine while unable to access any of the isolated networks concealed from respective processing engine.

20 Claims, 4 Drawing Sheets

SECURE ACCESS TO MULTIPLE ISOLATED NETWORKS

FIELD AND BACKGROUND OF THE INVENTION

The present invention, in some embodiments thereof, relates to securely accessing multiple isolated networks, and, more specifically, but not exclusively, to securely accessing multiple isolated networks without exposing them to each other by adjusting network mapping and routing settings to expose a single network at a time while concealing all other networks.

Networked services are constantly evolving for a plurality of applications, services and platforms ranging over practically every aspect of modern life. These networked services hence present multiple and ever increasing challenges for the underlying networks which become ever more complex.

However, since data may be transferred over open networks which are susceptible to interception, monitoring and/or eavesdropping, many of the networked services may suffer major privacy, security and/or integrity issues.

Various methods, technologies and protocols were devolved to address these vulnerabilities in the networked services. One such solution commonly applied to many client server applications, services and/or platforms comprises allocating isolated networks to connect different clients to the server.

Such isolated networks may include physical networks which are physically isolated from each other and/or virtual isolated networks, for example, Virtual Private Network (VPN) and/or the like established over the open network using one or more tunneling protocols.

SUMMARY OF THE INVENTION

An objective of the embodiments of the disclosure is to provide a solution which mitigates or solves the drawbacks and problems of conventional solutions. The above and further objectives are solved by the subject matter of the independent claims. Further advantageous embodiments can be found in the dependent claims. The disclosure aims at providing a solution for controlling and managing isolated networks to provide secure access and data retrieval from multiple isolated networks without exposing them to each other.

According to a first aspect of the present invention there is provided a computer implemented method of securely accessing data transferred via multiple isolated networks network, comprising using one or more processors of a server connected to a plurality of clients via a plurality of isolated networks for:
  Adjusting one or more mapping records comprising network mapping and routing settings for the plurality of isolated networks to expose one of the plurality of isolated networks to one or more processing engines executed by the one or more processors while concealing all other isolated networks from the respective processing engine.
  Activating a lock configured to enable each of the one or more processing engines to execute a single thread.
  Executing the one or more processing engines to fetch data from the exposed isolated network(s). Wherein each of the one or more processing engines is unable to access any of the isolated networks concealed to the respective processing engine.
  Releasing the lock.

According to a second aspect of the present invention there is provided a system for securely accessing data transferred via multiple isolated networks network, comprising one or more processors of a server connected to a plurality of clients via a plurality of isolated networks. The one or more processors is configured to execute a code. The code comprising:
  Code instructions to adjust one or more mapping record comprising network mapping and routing settings for the plurality of isolated networks to expose one of the plurality of isolated networks to one or more processing engine executed by the one or more processor while concealing all other isolated networks.
  Code instructions to activate a lock configured to enable the one or more processing engine to execute a single thread.
  Code instructions to execute the one or more processing engine to fetch data from the exposed isolated network. Wherein each of the one or more processing engines is unable to access any of the isolated networks concealed to the respective processing engine.
  Code instructions to release the lock.

In a further implementation form of the first and second aspects, one or more additional iterations are initiated to enable one or more of the processing engines to iterate over one or more additional isolated networks of the plurality of isolated networks. In each iteration a respective additional isolated network is exposed to one or more of the processing engines while all other isolated networks are concealed. Each iteration comprising:
  Adjusting the one or more mapping records to expose the respective additional isolated network to the one or more processing engines while concealing all other isolated networks from the respective processing engine.
  Activating the lock.
  Executing the one or more processing engines to fetch data from the respective additional isolated network(s).
  Releasing the lock.

In a further implementation form of the first and second aspects, the plurality of isolated networks are virtual private networks (VPNs).

In a further implementation form of the first and second aspects, each of the plurality of isolated networks is established according to one or more Layer 2 (L2) tunneling protocols.

In a further implementation form of the first and second aspects, adjusting the one or more mapping records is transparent to the one or more processing engine configured to access one or more of the isolated networks based on the one or more mapping records.

In a further implementation form of the first and second aspects, adjusting the one or more mapping records comprises adjusting U mapping and routing settings.

In a further implementation form of the first and second aspects, the one or more mapping records comprises namespace.

In a further implementation form of the first and second aspects, the one or more processing engines execute within respective containers.

In a further implementation form of the first and second aspects, one or more of the containers are Dockers.

In a further implementation form of the first and second aspects, the lock is controlled by one or more locking services of an operating system (OS) executed by the one or more processors.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
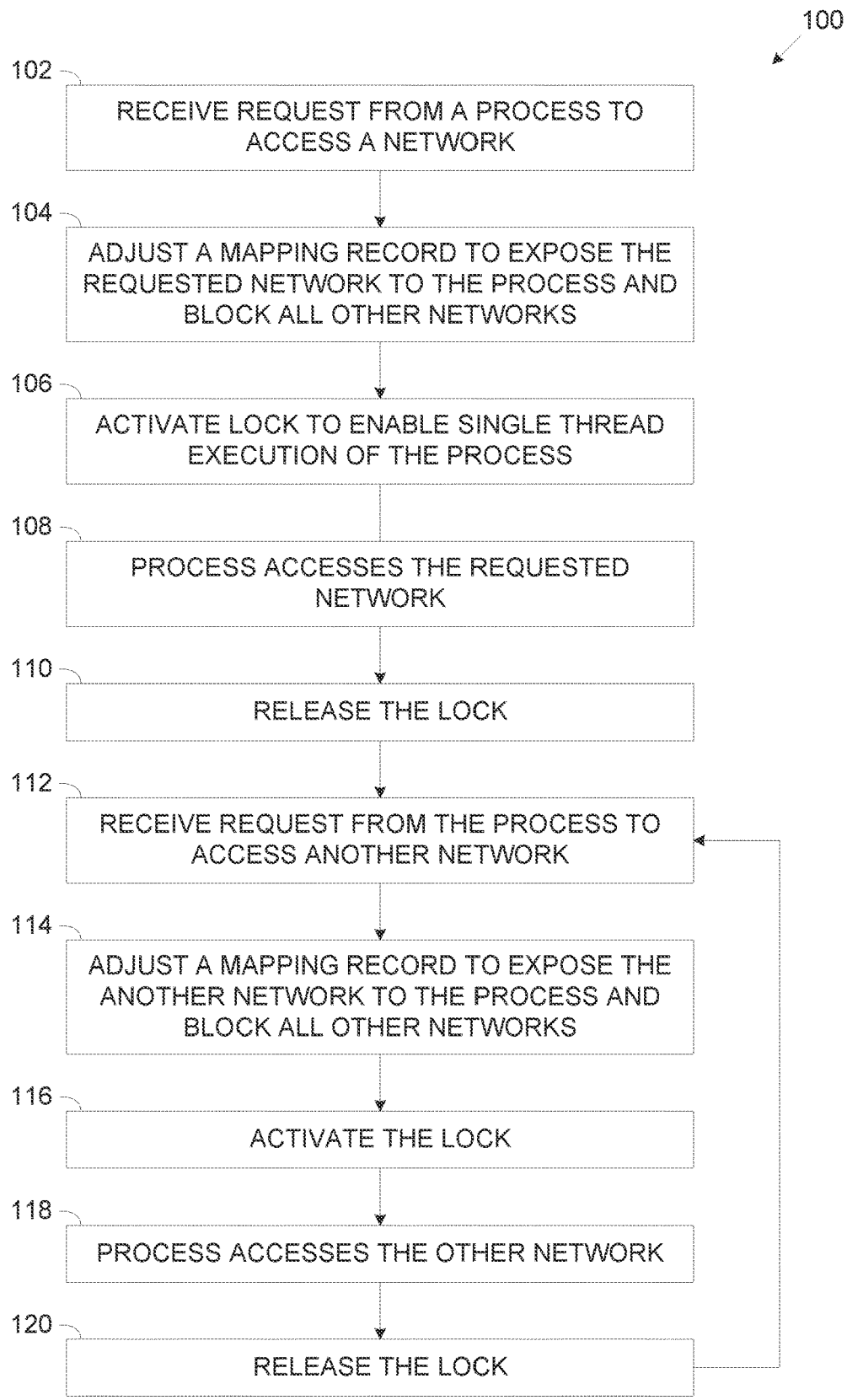
FIG. 1 is a flow chart of an exemplary process of securely accessing isolated networks by adjusting network mapping and routing settings to expose a single network at a time while concealing all other networks, according to some embodiments of the present invention.

The present invention, in some embodiments thereof, relates to securely accessing multiple isolated networks, and, more specifically, but not exclusively, to securely accessing multiple isolated networks without exposing them to each other by adjusting network mapping and routing settings to expose a single network at a time while concealing all other networks.

The present invention presents devices, systems and methods for controlling secure access of data processing engines executed by a server to a plurality of isolated networks connecting a plurality of client devices to the server without exposing any isolated network to any of the other isolated networks.

The plurality of client devices, for example, a computer, a server, a mobile device (e.g. Smartphone, tablet, etc.), a computing node and/or the like may be connected to the server via a plurality of respective isolated networks, either physically isolated networks and/or virtual isolated networks such as, for example, Virtual Private Networks (VPNs) such that no isolated channel and/or the data transmitted over it is accessible from any of the other isolated channels.

In particular, the isolated networks may be connected and controlled by one or more network controllers (network equipment), for example, a switch, a gateway, a router and/or the like of the server. The network controller(s) may include physical network equipment and/or virtual network controller, for example, a virtual switch such as, for example, OpenVPN, Open vSwitch (OVS) and/or the like.

The server which may comprise, for example, a server, a computing node, a cluster of computing nodes, a cloud computing service, system, platform and/or infrastructure and/or the like may execute one or more data processing engines, for example, an application, a service, an agent, a tool and/or the like which may need to access and fetch data from multiple isolated networks.

Each of the data processing engines may be typically executed in a respective container, for example, a Docker executed by the server in a virtualized execution environment such that the processing engines are separated and isolated from each other. As such, transfer of data between different processing engines may be strictly supervised, controlled, and optionally filtered and even completely prevented.

In order to prevent exposure of one isolated network to any of the other isolated networks, the network settings of the isolated networks may be dynamically adjusted in runtime to ensure that each data processing engine may be granted access to only a single isolated network at a time thus preventing a scenario in which two isolated networks are simultaneously accessible by a single data processing engine.

To this end, before a certain data processing engine is granted access to a certain isolated network, one or more mapping records, for example, a namespace, a Domain Name System (DNS) record, a routing table and/or the like may be adjusted in runtime to adjust their mapping and routing settings in order to expose the certain isolated network to the certain data processing engine thus enabling the certain data processing engine to access the certain isolated network and fetch data from it while concealing all of the other isolated networks and preventing access of the certain data processing engine to them. As result there can be no situation in which two isolated networks are simultaneously exposed to a single data processing engine and thus to each other.

While adjusting of the mapping record(s) may be done to adjust mapping and routing settings of one or more of the network layers, for example, Layer 2, Layer 3 and/or the like, the adjustment may be primarily directed to the L2 mapping and routing settings.

Moreover, adjusting the network mapping and routing settings may be done transparently to the processing engines and possibly transparently even to the network controllers which may be therefore unaware of any such adjustments and may simply use the network mapping and routing settings as they normally do oblivious to the adjustments.

Optionally, in the default and/or normal operation configuration, the mapping record(s) is configured to conceal all of the isolated networks to the data processing engine(s) such that the processing engine(s) are unable to access any of the isolated networks.

Moreover, in order to further ensure that each data processing engine may not be able to simultaneously access more than just one isolated network, prior to granting each data processing engine access to a certain isolated network, a lock may be initiated for the respective data processing engine. The lock which may be implemented using one or more lock mechanisms, services, tools and/or provisions configured to disable multi-thread processing for one or more processes and enable the respective process to execute only a single thread at a time.

Each locked processing engine may be therefore able to execute only a single thread at a time, specifically access the certain exposed isolated network and fetch data from it. Since it is unable to initiate additional threads, the locked processing engine may be unable to access and fetch data from any other isolated network thus further ensuring the isolation between the isolated networks.

Exposing only one isolated network at a time to each processing engine may present significant advantages and benefits compared to currently existing methods and systems configured to provide access to multiple isolated networks.

First, adjusting the mapping record(s) to expose only a single isolated network to each processing engine executed by the server may ensure that, since the processing engine is physically unable to access more than one isolated network at a time, there can be no situation in which the processing engine is able to access two different isolated networks and thus expose them to each other. This may significantly reduce complexity, cost, computing resources utilization and/or computing time of the processing engines and/or the execution environment of the server since there is no need for complex and resource consuming task level (i.e. processing engine level) security and/or protection measures as may be used by the existing methods.

Moreover, common deployments exist in which the processing engines may not be tolerable to adjustment of their network settings, i.e., their mapping and routing settings. For example, in case the processing engines are executed in containers, the containers may be unable to switch their mapping record(s), for example, namespace in runtime. Some of the existing methods may initiate complex applications to overcome this, for example, initiate multiple processing engine containers each capable of accessing a limited number of isolated networks which may communicate with each other, typically using complex source consuming security and/or protection measures, to share between them data collected from the different isolated networks. In contrast, adjusting the network settings, typically the L2 mapping and routing settings, in runtime, transparently to processing engine containers as done in the present invention may enable any single processing engine container to access multiple isolated networks without exposing the isolated networks to each other and thus not compromising privacy, security and/or safety of the isolated networks and/or the data transmitted over them.

Furthermore, simply adjusting the network settings as may be done by the existing methods may require re-initialization of the network controller(s) of the server, whether physical network controller(s) and/or virtual network controller(s). On the other hand, dynamically adjusting the network settings, typically the L2 mapping and routing settings, in runtime, as done in the present invention may be transparent to the network controller(s) (e.g. switch, gateway. Etc.) which may therefore uninterruptedly continue to control, manage and route packets between the isolated networks according to the adjusted network settings.

In addition, locking each processing engine accessing an isolated network to execute only a single thread may limit the processing engine to access only one isolated network at a time by preventing it from initiating additional threads which may be potentially executed to access additional isolated networks.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the figures, FIG. 1 is a flow chart of an exemplary process of securely accessing isolated networks by adjusting network mapping and routing settings to expose a single network at a time while concealing all other networks, according to some embodiments of the present invention.

An exemplary process 100 may be executed by server serving a plurality of client devices each connected to the server via a respective isolated network (links), either physical networks and/or virtual networks, to preserve security, safety and/or privacy of the data transferred between each client device and the server.

One or more data processing engines, for example, an application, a service, an agent, a tool and/or the like may need to fetch data from multiple networks of the plurality of isolated networks and may therefore need to access multiple isolated networks.

However, while several isolated networks need to be accessed, the isolation of each isolated network must be ensured to prevent potential data leak and/or exposure to cyberattack vectors from one isolated network to another.

Each processing engine may be therefore configured, adapted and/or operated to access only a single isolated network at a time. Moreover, at any given time only one of the plurality of isolated networks may be exposed to each processing engine while all other isolated networks are concealed and thus inaccessible to the respective processing engine.

Moreover, one or more mechanism may be applied to execute each processing engine in a locked mode which enables the processing engine to execute a single thread thus limiting the processing engine to access a single isolated network.

As such, while a plurality of processing engines may be executed by the server optionally simultaneously, each processing engine may be capable of "seeing" and accessing only a single isolated network at a time.

Figure 2A:
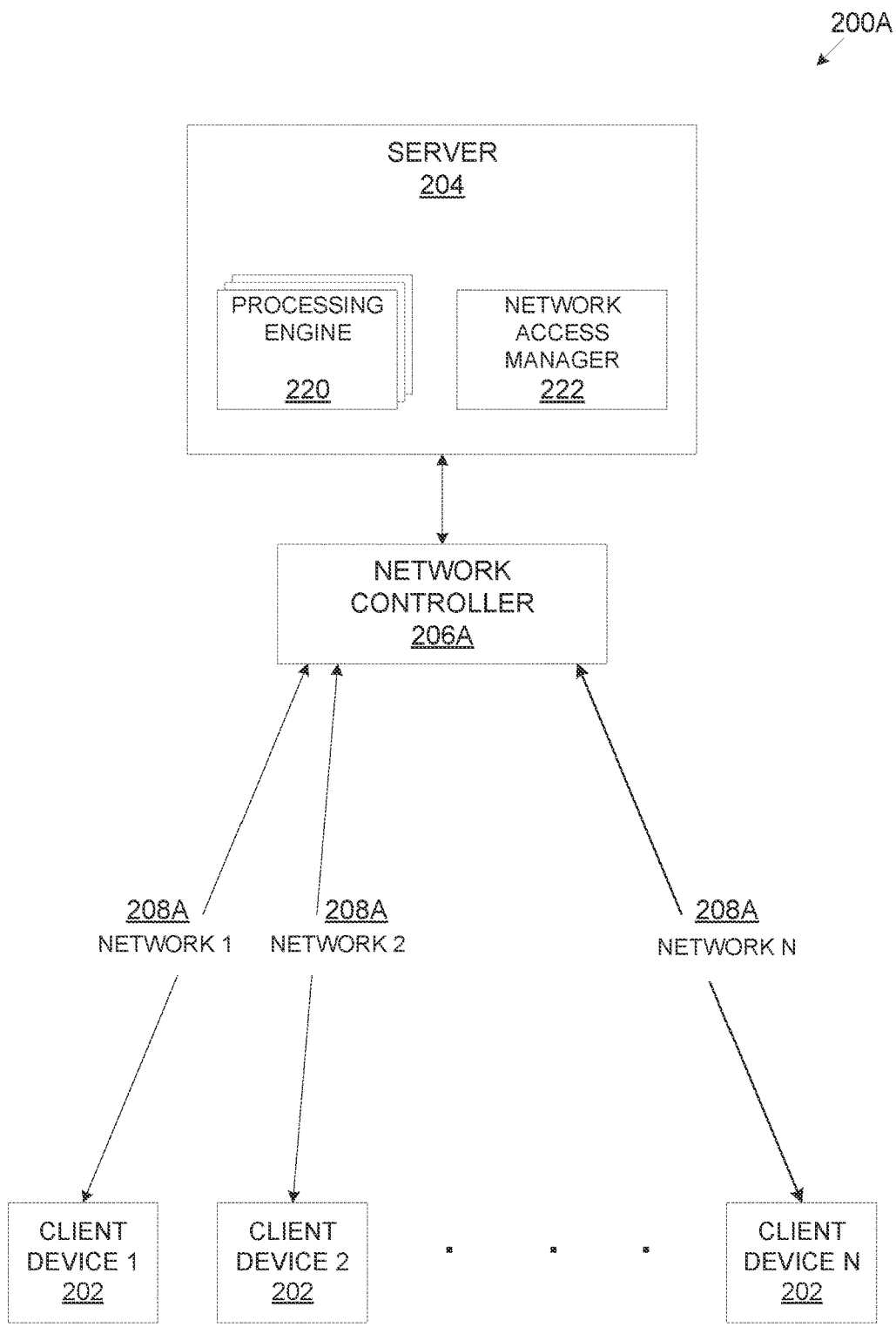
FIG. 2A, FIG. 2B and FIG. 2C are schematic illustrations of exemplary networked systems for securely accessing isolated networks by adjusting network mapping and routing settings to expose a single network at a time while concealing all other networks, according to some embodiments of the present invention.
Figure 2B:
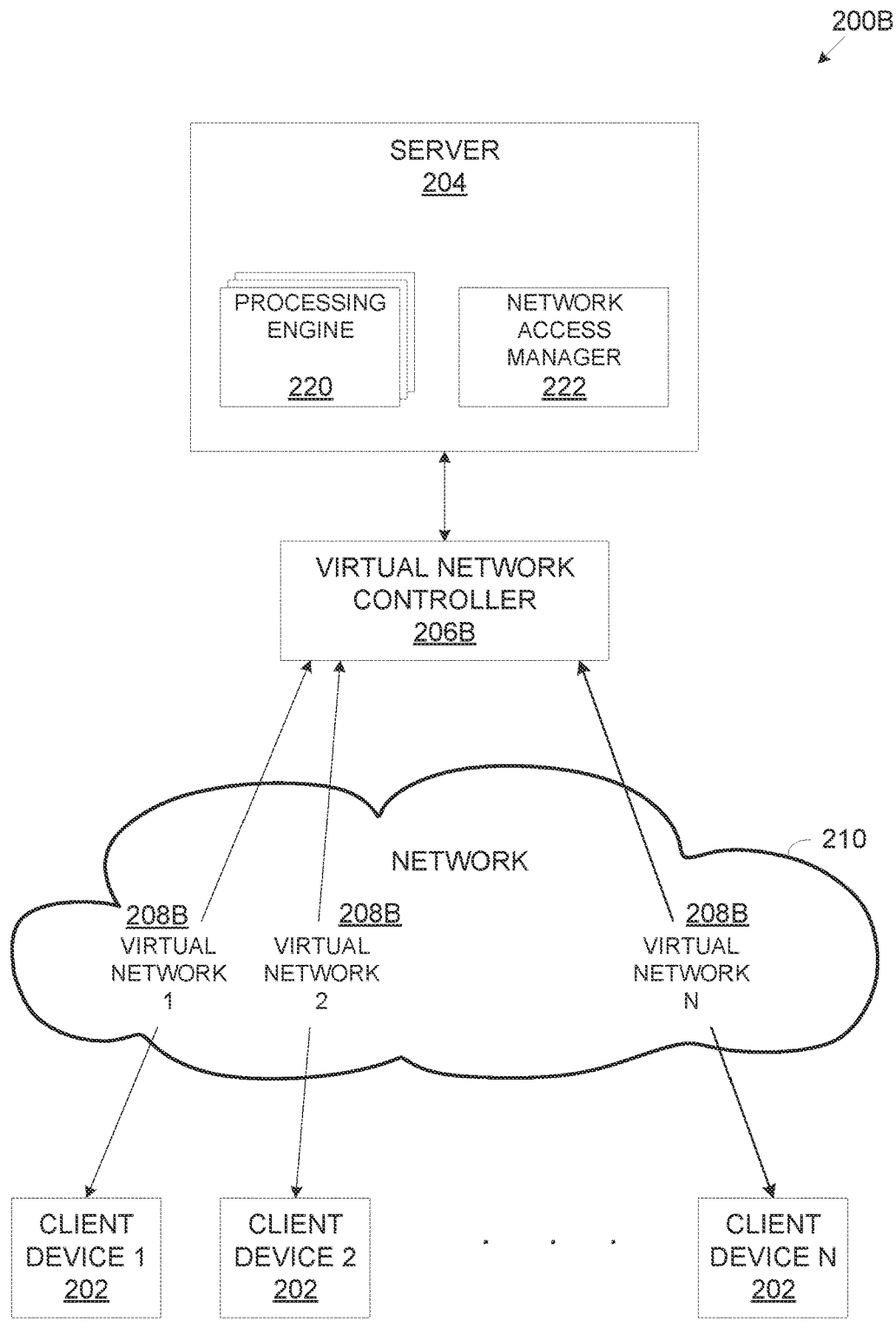
Figure 2C:
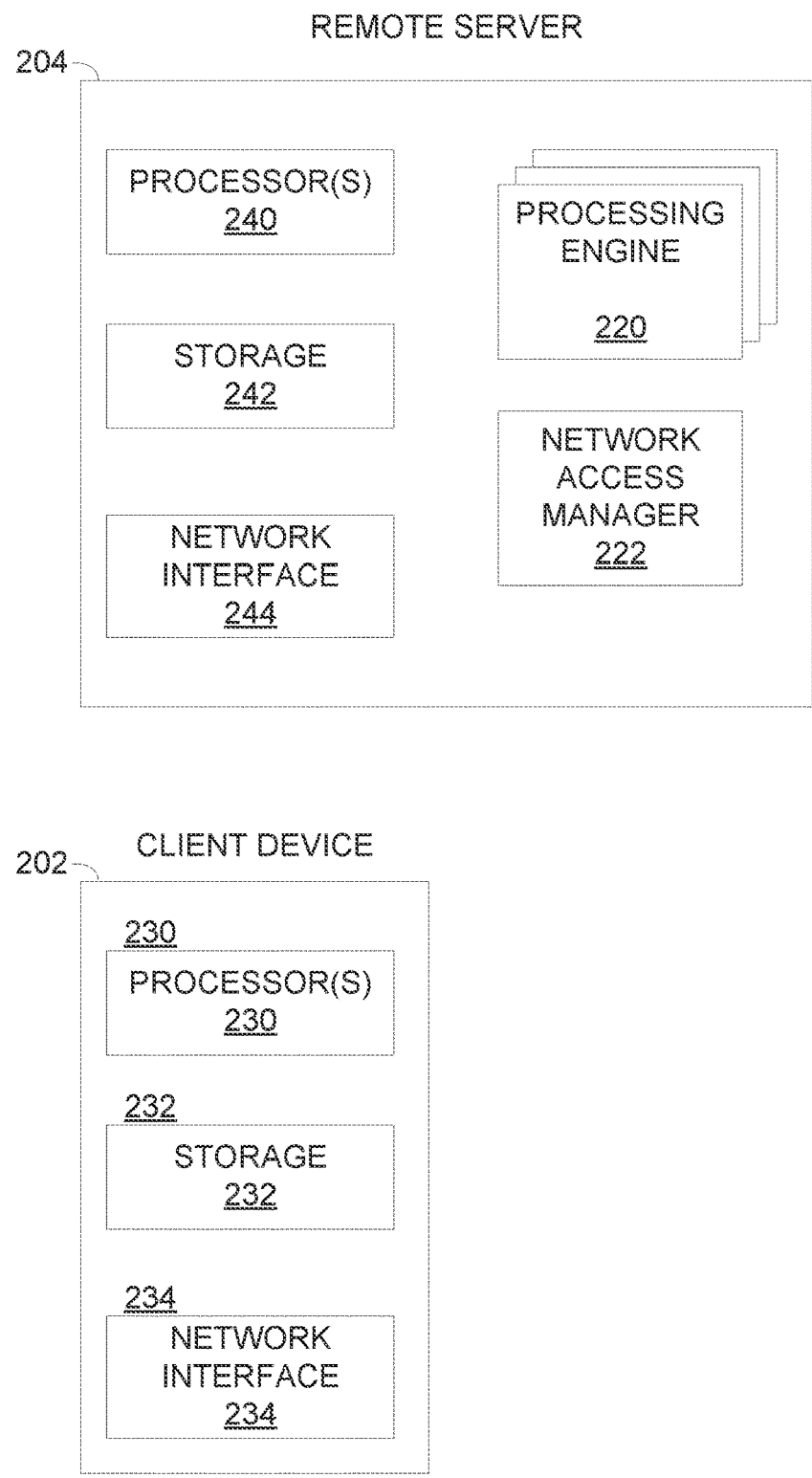

Reference is also made to FIG. 2A, FIG. 2B and FIG. 2C, which are schematic illustrations of exemplary networked systems for securely accessing isolated networks by adjusting network mapping and routing settings to expose a single network at a time while concealing all other networks, according to some embodiments of the present invention.

FIG. 2A and FIG. 2B present exemplary networked environments 200A and 200B respectively.

The first networked environment 200A may comprise a plurality of client devices 202, for example, a computer, a server, a mobile device (e.g. Smartphone, tablet, etc.), a computing node and/or the like configured and/or operated to access a server 204 providing one or more services to a plurality of client devices 202.

The server 204 may include, for example, a server, a computing node, a cluster of computing nodes and/or the like. However, the server 204 may further include one or more cloud computing services, systems, platforms and/or infrastructures, for example, an Infrastructure as a Service (IaaS), a Platform as a Service (PaaS), a Software as a Service (SaaS) and/or the like such as, for example, Amazon Web Service (AWS), Google Cloud, Microsoft Azure and/or the like.

Each of the plurality of client devices 202 may communicate with the server 204 via a dedicated isolated network 208A, for example, a Local Area Network (LAN), a Wide Area Network (WAN) and/or the like connected to a network controller 206A (network equipment) of the server 204, for example, gateway, a router, a switch, and/or the like. For example, a first client device 202 may connect to the network controller 206A via a first isolated network 208A, a second client device 202 may connect to the network controller 206A via a second isolated network 208A and so on to a $N^{th}$ client device 202 which may connect to the network controller 206A via a $N^{th}$ isolated network 208A.

The network controller 206A may be deployed and/or implemented as a separate module or it may be integrated with the server 204. Moreover, for brevity only a single network controller 206A is described herein after. This, however, should not be construed as limiting since a plurality of network controller 206A may be deployed in one or more structures, architectures, hierarchies and/or arrangements as known in the art to support the plurality of networks 208 connecting to the plurality of client devices 202 and to the server 204.

However, while one or more of the client devices 202 may connect and communicate with the server 204 via the isolated physical networks 208A, one or more of the client devices 202 may typically establish a virtual isolated network (link) 208B with the server 204 as seen in the second exemplary networked environment 200B.

Specifically, one or more of the client devices 202 may establish respective isolated virtual networks 208B with one or more virtual network controllers 206B connecting to the server 204 over a shared physical network 210 comprising one or more wired and/or wireless networks, for example, a LAN, a Wireless LAN (WLAN, e.g. Wi-Fi), a WAN, a Metropolitan Area Network (MAN), a cellular network, the internet and/or the like.

For example, a first client device 202 may connect to the virtual network controller 206B via a first virtual isolated network 208B, a second client device 202 may connect to the virtual network controller 206B via a second virtual isolated network 208B and so on to a $N^{th}$ client device 202 which may connect to the virtual network controller 206B via a $N^{th}$ virtual isolated network 208B.

The virtual network controller 206B comprising one or more virtual switches, for example, an OpenVPN, an Open vSwitch (OVS) and/or the like may be configured to establish one or more virtual isolated networks 208B, for example, Virtual Private Network (VPN) and/or the like with receptive client devices 202. The virtual network controller 206B which may be implemented as a separate module or integrated with the server 204 may be configured to create, establish, control and/or manage a respective virtual isolated network 208B, for example, a VPN link with each of one or more of the client devices 202.

For example, the virtual network controller 206B may create, establish, control and/or manage the virtual isolated networks 208B according to one or more tunneling protocols as known in the art. The tunneling protocols may include one or more Layer 2 (L2) tunneling protocols (L2TP). However, the tunneling protocols may further include one or more Layer 3 (L3) tunneling protocols as known in the art, for example, Generic Routing Encapsulation (GRE), Virtual Extensible Local Area Network (VXLAN), Secure Socket Tunneling Protocol (SSTP), Internet Protocol Security (IP-Sec), IP in IP (IP in IPv4/IPv6), SIT/IPv6 (IPv6 in IPv4/IPv6), OpenVPN and/or the like.

As described for the network controller 206A, the virtual network controller 206B may be deployed and/or implemented as a separate module executed by a separate hardware and/or software system or it may be integrated with the server 204. Moreover, similarly to the network controller 206A, while only a single virtual network controller 206B is described herein after, it should not be construed as limiting since a plurality of virtual network controllers 206A may be deployed in a plurality of deployments as may become apparent to a person skilled in the art to support connection to the plurality of networks 208 connecting the plurality of client devices 202 and the server 204.

Furthermore, the plurality of client devices 202 may optionally connect to the server 204 via a combination of one or more physical network controllers such as the network controller 206A and one or more virtual network controllers such as the virtual network controller 206B.

As known in the art, the physical network controller 206A and the virtual network controller 206B may employ similar mechanisms, algorithms, protocols and/or the like for mapping and routing the network nodes connected to them, namely the plurality of client devices 202 and the server 204 regardless of whether they are connected via isolated physical networks 208 or via virtual isolated networks. Therefore, for brevity, the physical network controller 206A and the virtual network controller 206B are commonly designated the network controller 206. Complementary, the term isolated networks 208 is used herein after to include both physical isolated networks 208A and/or virtual isolated networks 208B.

The network controller 206 may employ one or more mapping and routing mechanisms, protocols, structures and/or the like for mapping the plurality of client devices 202 and routing (data) packets between the isolated networks 208. Specifically, the network controller 206 map the client devices 202 and route packets between them and the server 204 and optionally among themselves using one or more mapping and/or routing records, collectively designated mapping records herein after, comprising mapping and/or routing settings expressing network mapping information relating to the client devices 202 and/or routing rules for routing packets between the isolated networks 208 and the server 204.

The mapping records may include, for example, namespace and/or the like which may uniquely map each networked resource in the network environment 200, for example, the client devices 202, the isolated networks 208, the server 204 and/or the like with a unique identifier. In another example, the mapping records may include one or more Domain Name system (DNS) records comprising identification and/or mapping information relating to the networked resource in the network environment 200, for example, the client devices 202, the isolated networks 208, the server 204 and/or the like. In another example, the mapping records may include one or more routing tables as known in the art which comprise routing information and/or routing rules for routing the packets between the isolated networks 208 and the server 204 and optionally between one or more of the isolated networks 208.

While the mapping record(s) may relate to L3 mapping of the networked resource (e.g. client devices 202, isolated networks 208, etc.) and/or L3 routing of the data packet, the mapping record(s) may primarily relate to L2 mapping of the networked resource in the network environment 200, for example, the client devices 202, the isolated networks 208, the server 204 and/or the like and L2 routing of the packets between the isolated networks 208.

The server 204 may execute one or more data processing engines 220 configured to access one or more of the isolated networks established with the client devices 202 and fetch data from these networks.

The server 204 may further execute a network access manager 222 to manage access of the processing engine(s) to the isolated networks in order to ensure isolation of the networks and thus ensure privacy, security and/or safety of the isolated networks and the data exchanged in them.

As seen in FIG. 2C, each client device 202 may comprise a processor(s) 230, a storage 232 for storing data and/or code (program store), and a network interface 234 for connecting to the network 208.

One or more of the client devices 202 may further include an Input/Output (I/O) interface for connecting to one or more external and/or attachable devices. Optionally, one or more of the client devices 202 may also include a user interface comprising one or more Human Machine Interfaces (HMI) for interacting with respective users.

The network interface 234 may include one or more wired and/or wireless network interfaces for connecting to the network 208, for example, a LAN interface, a WLAN interface, a WAN interface, a MAN interface, a cellular interface and/or the like.

The processor(s) 230, homogenous or heterogeneous, may include one or more processing nodes and/or cores arranged for parallel processing, as clusters and/or as one or more multi core processor(s). The storage 232 may include one or more non-transitory persistent storage devices, for example, a Read Only Memory (ROM), a Flash array, a Solid State Drive (SSD), a hard drive (HDD) and/or the like. The storage 232 may also include one or more volatile devices, for example, a Random Access Memory (RAM) component, a cache and/or the like.

The processor(s) 230 may execute one or more software modules such as, for example, a process, a script, an application, an agent, a utility, a tool, an Operating System (OS) and/or the like each comprising a plurality of program instructions stored in a non-transitory medium (program store) such as the storage 232 and executed by one or more processors such as the processor(s) 230.

The processor(s) 230 may further, integrate, utilize and/or facilitate one or more hardware elements (modules) integrated and/or utilized in the client device 202, for example, a circuit, a component, an Integrated Circuit (IC), an Application Specific Integrated Circuit (ASIC), a Field Programmable Gate Array (FPGA), a Digital Signals Processor (DSP), a Graphic Processing Unit (GPU) and/or the like.

The processor(s) 230 may therefore execute one or more functional modules implemented using one or more software modules, one or more of the hardware modules and/or combination thereof, for example, a web browser, a local agent, an access application and/or the like for connecting and communicating with the server 204 to access one or more of the services provided by the server 204.

Moreover, in case of the client device 202 establishes a virtual network (link) with the server 204, specifically with the virtual network controller 206B of the sever 204, the client device 202 may further execute one or more functional modules for establishing the virtual network via the network interface 234 over the network 208.

The server 204 may comprise a processor(s) 240 such as the processor(s) 230 for executing the process 100, a storage 242 for storing data and/or code (program store), and a network interface 244 such as the network interface 234 for connecting to the network 208, in particular to the network controller 206A and/or to the virtual network controller 206B.

The processor(s) 240, homogenous or heterogeneous, may include one or more processing nodes and/or cores arranged for parallel processing, as clusters and/or as one or more multi core processor(s). As described for the storage 232, the storage 242 may include one or more non-transitory persistent storage devices as well as one or more volatile devices. The storage 242 may further comprise one or more network storage devices, for example, a storage server, a Network Accessible Storage (NAS), a network drive, a database server and/or the like accessible through the network interface 244.

The processor(s) 240 may further, integrate, utilize and/or facilitate one or more hardware elements (modules) integrated and/or utilized in server 204, for example, a circuit, a component, an IC, an ASIC, an FPGA, a DSP, a GPU, an Artificial Intelligence (AI) accelerator and/or the like.

The processor(s) 240 may therefore execute one or more functional modules implemented using one or more software modules, one or more of the hardware modules and/or combination thereof, for example, the one or more (data) processing engines 220 and the network access manager 222.

Optionally, the processor(s) 230 are configured and/or operated to apply virtualization such that each of the processing engines 220 is isolated from the other processing engines 220. For example, one or more of the processing engines 220 may be executed in the context of respective isolated containers, for example, a Docker and/or the like comprising all required functional and/or software modules thus eliminating their need for external services and maintaining their isolation.

For brevity, the process 100 is described for a single data processing engine 220 accessing and fetching data from multiple isolated networks 208. This however, should not be construed as limiting, since the process 100 may be expanded to a plurality of data processing engine 220 each accessing and fetching data from at least some of the isolated networks 208. However, while multiple data processing engine 220 may access multiple isolated networks 208, at any given time only one isolated network 208 may be exposed and accessible to each processing engine 220.

As shown at 102, the network access manager 222 may receive a request from the processing engine 220 to access a certain one of the isolated networks 208, for example, a first isolated network 208 and fetch data from it.

As shown in 104, in response to the request, the network access manager 222 may adjust one or more of the mapping records used to map the networked resource at the server 204, for example, the client devices 202, the isolated networks 208 and/or the like.

Specifically, the network access manager 222 may adjust the mapping record(s) to expose the first isolated network 208 to the processing engine 220 while concealing all other isolated networks 208 from the processing engine 220 such that the processing engine 220 is able to access the first isolated network 208 while unable to access to all other isolated networks 208.

Typically, the network access manager 222 may adjust L2 mapping record(s) comprising mapping and routing settings defining L2 mapping of the isolated networks 208 and/or the client devices 202 and L2 routing rules. Adjusting the L2 mapping and routing settings may be highly efficient, effective and/or robust compared to the mapping and routing settings in other layers, for example, L3, since address resolution including packet source/destination address resolution and routing may be done beneath the network controller 206 thus avoiding manipulation of the network controller 206. Rather, the network controller 206 may use the adjusted mapping record(s) normally oblivious to the adjustment(s).

Moreover, the network access manager 222 may adjust the mapping record(s) transparently to the processing engine 220 such that the processing engine 220 may be unaware of the adjustment of its network mapping and routing settings. This may be of particular benefit in case the processing engine 220 is executed as a Docker since Dockers are unable to switch their mapping record(s) in runtime. Therefore, adjusting, in runtime and transparently to the processing engine 220 Docker, the single mapping record(s) used by the processing engine 220 Docker, may enable manipulation of the mapping and routing settings of the processing engine 220 Docker without affecting its normal operation.

The network access manager 222 may use and/or apply one or more methods, tools, and/or services to adjust the mapping record(s).

For example, assuming the processing engine 220 is executed as a Docker and further assuming the isolated networks 208 are virtual isolated networks 208B, for example, VPN links controlled by the network controller 206 implemented by a virtual network controller 206B, for example, OpenVPN executed at the server 204. In such case, the network access manager 222 may adjust the mapping record(s), for example, the namespace using one or more services and/or tools available in the execution environment of the server 204, for example, net_admin in Linux or equivalent services and/or tools in other execution environments or operating systems. As a result, the virtual network controller 206B, specifically the OpenVPN using the namespace may expose the first isolated network 208 to the processing engine 220 Docker while concealing all other isolated networks 208.

In another example, assuming the isolated networks 208 are physical isolated networks 208A controlled by the network controller 206 implemented by a physical network controller 206A. In such case, the network access manager 222 may adjust one or more of the mapping record(s), for example, the routing table used by physical network controller 206B to map the isolated networks 208A and route packets to and/or from the isolated networks 208A to and/or from the server 204. As a result, the first isolated network may be exposed and accessible to the processing engine 220 while all other isolated networks 208A are concealed and inaccessible to the processing engine 220.

In another example, the network access manager 222 may adjust the mapping record(s), for example, the routing table to enable passing of all non-internal program and/or IaaS traffic through the destination isolated network 208. Moreover, the network access manager 222 may further adjust the mapping record(s), for example, the default iptables rules to only allow established connections in the INPUT table thus preventing the isolated networks 208 from initiating requests back to the SaaS infrastructure. Furthermore, the network access manager 222 may adjust one or more default network routing rules to allow forwarding of packets through the server 204 serving as a forwarder while masquerading the packet required by the processing engine 220 from the accessed isolated network 208.

As shown at 106, a lock may be activated, optionally by the network access manager 222 to enable the processing engine 220 to execute a single thread, for example, access and fetch data from a single isolated network 208.

The lock may be implemented using one or more lock mechanisms, services and/or provisions provided by the execution environment, for example, the operating system which are configured to disable multi-thread processing for one or more processes and enable each process to execute only a single thread at a time. For example, a reentrant lock such as, for example, RLock( ) may be applied to the processing engine 220 to enable simultaneous access of the current thread (of the processing engine 220) to one or more specific areas of code. In another example, one or more resource access restriction locks, for example, a mutex, a semaphore and/or the like may be used to prevent the current thread (of the processing engine 220) from accessing one or more specific areas of code.

Optionally, the lock mechanism(s) may be applied to selectively prevent access of the thread of the processing engine 220 to certain code areas. For example, the lock may be applied to prevent the processing engine 220 from accessing (and executing) one or more code areas comprising code relating to communications with the isolated networks 208 while one or more other parts of the code which do not relate to the isolated networks 208 may remain unlocked and thus executable by the processing engine 220.

The lock may be therefore applied to disable multi-thread processing for the processing engine 220 and enable the processing engine 220 to execute only a single thread, for example, access and fetch data from the first isolated network 208.

As shown at 108, the processing engine 220 may access the exposed isolated network 208, namely the first isolated network 208 to fetch data from it.

Since only the first isolated network 208 is exposed to the processing engine 220, the processing engine 220 may access and fetch data only from the exposed first isolated network 208 while unable to access any of the other isolated networks 208 which are concealed from the processing engine 220.

Moreover, since the lock is activated for the processing engine 220, the processing engine 220 may execute a single thread, specifically, access and fetch data from the first isolated network 208 while unable to execute additional thread(s) for accessing one or more other isolated networks 208.

As shown at 110, the lock may be released for the processing engine 220 to enable it to resume normal multi-thread execution.

As shown at 112, the processing engine 220 may issue another request to the network access manager 222 to access and fetch data from another one of the isolated networks 208, for example, a second isolated network 208.

As shown at 114, in response to the request, the network access manager 222 may adjust the mapping record(s) as described at 104 to expose the second isolated network 208 to the processing engine 220 while concealing all other isolated networks 208 from the processing engine 220 such that access to the second isolated network 208 is enabled for the processing engine 220 while its access to all other isolated networks 208 is disabled.

As shown at 116, the lock may be activated again, optionally by the network access manager 222 to once again enable the processing engine 220 to execute only a single thread, for example, access and fetch data from a single isolated network 208.

As shown at 118, the processing engine 220 may access the other exposed isolated network 208, namely the second isolated network 208 to fetch data from it.

Since only the second isolated network 208 is exposed to the processing engine 220, the processing engine 220 may access and fetch data only from the exposed second isolated network 208 while unable to access any of the other isolated networks 208 which are concealed from the processing engine 220.

Moreover, since the lock is activated for the processing engine 220, the processing engine 220 may execute a single thread, specifically, access and fetch data from the second isolated network 208 while unable to execute additional thread(s) for accessing one or more other isolated networks 208.

As shown at 120, the lock may be released for the processing engine 220 to enable it to resume normal multithread execution.

As seen, one or more additional iterations of the process 100 may be initiated, specifically steps 112-120, typically in response to request(s) from the processing engine 220 to iterate over one or more additional isolated networks 208 in order to access them and fetch data from them.

In each such iteration initiated to enable the processing engine 220 to access and fetch data from a respective isolated networks 208, the network access manager 222 may adjust the mapping record(s) to expose the respective isolated network 208 to the processing engine 220 while concealing all other isolated networks 208 from the processing engine 220 thus preventing the processing engine 220 from accessing the other isolated networks 208. The lock may be then activated to enable the processing engine 220 to execute only a single thread for accessing only the respective isolated data 208 and fetch data from it. Finally, after the processing engine 220 fetches the data from the respective isolated data 208, the lock may be released for the processing engine 220 to enable it to resume normal multithread execution.

Optionally, in its default configuration, the mapping record(s) is configured to conceal all of the isolated networks 208 to the data processing engine 220 such that the processing engine 220 is unable to access any of the isolated networks 208. As such, the processing engine 220 may access one of the isolated networks 220 only after the network access manager 222, in response to a request, adjusts the mapping record(s) to expose the requested isolated network 208 to the processing engine 220 specifically while concealing all other isolated networks 208.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms virtual networking, VPN, tunneling protocols, virtual node and virtual switch are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of securely accessing data transferred via multiple isolated networks network, comprising:
using at least one processor of a server connected to a plurality of clients via a plurality of isolated networks for:
adjusting at least one mapping record comprising network mapping and routing settings for the plurality of isolated networks to expose one of the plurality of isolated networks to at least one processing engine executed by the at least one processor while concealing all other isolated networks;
activating a lock configured to enable the at least one processing engine to execute a single thread;
executing the at least one processing engine to fetch data from the exposed isolated network, wherein the at least one processing engine is unable to access any of the concealed isolated networks; and
releasing the lock.

2. The computer implemented method of claim 1, further comprising initiating at least one additional iteration to enable the at least one processing engine to iterate over at least one additional isolated network of the plurality of isolated networks, in each iteration a respective additional isolated network is exposed to the at least one processing engine while concealing all other isolated networks, each iteration comprising:
adjusting the at least one mapping record to expose the respective additional isolated network to the at least one processing engine while concealing all other isolated networks,
activating the lock,
executing the at least one processing engine to fetch data from the respective additional isolated network, and
releasing the lock.

3. The computer implemented method of claim 1, wherein the plurality of isolated networks are virtual private networks (VPNs).

4. The computer implemented method of claim 1, wherein each of the plurality of isolated networks is established according to at least one Layer 2 (L2) tunneling protocol.

5. The computer implemented method of claim 1, wherein adjusting the at least one mapping record is transparent to the at least one processing engine configured to access at least one of the isolated networks based on the at least one mapping record.

6. The computer implemented method of claim 1, wherein adjusting the at least one mapping record comprises adjusting L2 mapping and routing settings.

7. The computer implemented method of claim 1, wherein the at least one mapping record comprises namespace.

8. The computer implemented method of claim 1, wherein the at least one processing engine executes within a container.

9. The computer implemented method of claim 8, wherein the container is a Docker.

10. The computer implemented method of claim 1, wherein the lock is controlled by at least one locking service of an operating system (OS) executed by the at least one processor.

11. A system for securely accessing data transferred via multiple isolated networks network, comprising:
at least one processor of a server connected to a plurality of clients via a plurality of isolated networks, the at least one processor is configured to execute a code, the code comprising:
code instructions to adjust at least one mapping record comprising network mapping and routing settings for the plurality of isolated networks to expose one of the plurality of isolated networks to at least one processing engine executed by the at least one processor while concealing all other isolated networks;
code instructions to activate a lock configured to enable the at least one processing engine to execute a single thread;
code instructions to execute the at least one processing engine to fetch data from the exposed isolated network, wherein the at least one processing engine is unable to access any of the concealed isolated networks; and
code instructions to release the lock.

12. The system of claim 11, wherein the code further comprising code instructions for initiating at least one additional iteration to enable the at least one processing engine to iterate over at least one additional isolated network of the plurality of isolated networks, in each iteration a respective additional isolated network is exposed to the at least one processing engine while concealing all other isolated networks, each iteration comprising:
adjusting the at least one mapping record to expose the respective additional isolated network to the at least one processing engine while concealing all other isolated networks,
activating the lock,
executing the at least one processing engine to fetch data from the respective additional isolated network, and
releasing the lock.

13. The system of claim 11, wherein the plurality of isolated networks are virtual private networks (VPNs).

14. The system of claim 11, wherein each of the plurality of isolated networks is established according to at least one Layer 2 (L2) tunneling protocol.

15. The system of claim 11, wherein adjusting the at least one mapping record is transparent to the at least one processing engine configured to access at least one of the isolated networks based on the at least one mapping record.

16. The system of claim 11, wherein adjusting the at least one mapping record comprises adjusting L2 mapping and routing settings.

17. The system of claim 11, wherein the at least one mapping record comprises namespace.

18. The system of claim 11, wherein the at least one processing engine executes within a container.

19. The system of claim 18, wherein the container is a Docker.

20. The system of claim 11, wherein the lock is controlled by at least one locking service of an operating system (OS) executed by the at least one processor.

\* \* \* \* \*